United States Patent [19]

Bouygues et al.

[11] 4,353,387
[45] Oct. 12, 1982

[54] DRAINAGE DEVICE

[75] Inventors: Pierre A. Bouygues, Decines; Jean-Marie Delcoustal, Bron, both of France

[73] Assignee: Delle-Alsthom, Villeurbanne, France

[21] Appl. No.: 150,121

[22] Filed: May 15, 1980

[30] Foreign Application Priority Data

May 25, 1979 [FR] France ............................... 79 13324

[51] Int. Cl.³ ................................................ F16T 1/00
[52] U.S. Cl. ...................................... 137/203; 137/204
[58] Field of Search ......................... 137/203, 204, 192

[56] References Cited

U.S. PATENT DOCUMENTS

| 2,007,358 | 7/1935 | Anger | 137/204 |
| 2,362,724 | 11/1944 | Shea | 137/197 X |
| 2,552,518 | 5/1951 | Churchman | 137/203 |
| 2,845,081 | 7/1958 | George | 137/204 |

FOREIGN PATENT DOCUMENTS 1170146 9/1958 France .
1363011 4/1964 France .
2296809 7/1976 France .

Primary Examiner—Alan Cohan
Attorney, Agent, or Firm—Sughrue, Mion, Zinn, Macpeak & Seas

[57] ABSTRACT

The drainage device includes a drainage chamber (9) which communicates via an inlet pipe (20) with a compressed air tank and is provided with an outlet orifice (16), elements (5,24) for closing the outlet orifice and elements (5,19,1,21) for opening the outlet orifice while partially closing off the inlet pipe. Application to gas-blast circuit breaker installations.

5 Claims, 1 Drawing Figure

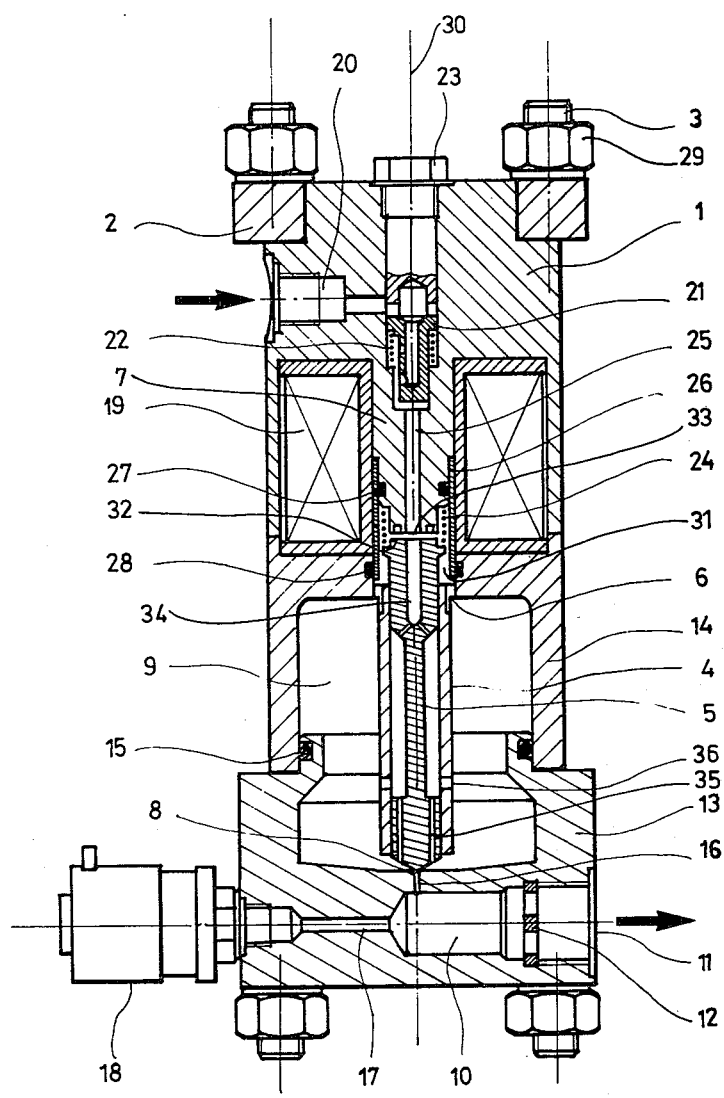

DRAINAGE DEVICE

FIELD OF THE INVENTION

The present invention relates to a drainage device and more particularly to a drainage device for removing a liquid contained in a compressed gas tank, said liquid being obtained by condensing water vapour possibly containing various impurities (traces of oil).

BACKGROUND OF THE INVENTION

In air blast circuit-breaker installations, high-pressure air tanks are used in which the air is compressed by compressors which communicate via discharge units to high-pressure tanks which feed the circuit-breakers. To prevent ingress of impurities and more particularly of dampness in the cut-out chambers of the circuit-breakers, the high-pressure tanks are provided with drainage devices. Known devices of this type are constituted by controllable valves disposed at the bottom of the tanks.

Known drainage devices have the disadvantage of requiring high air consumption e.g. several cubic meters, the valve opening time frequently being a few seconds. Such air consumption requires an appreciable increase in the operation time of the compressors.

The present invention aims to mitigate said disadvantage and to produce a drainage device which considerably reduces air consumption.

SUMMARY OF THE INVENTION

The present invention provides a drainage device for removing liquid contained in a compressed gas tank, said device including:

a drainage chamber which communicates with the lower portion of the tank, said drainage chamber being provided with an outlet orifice which communicates with the air of the atmosphere;

first means for closing the outlet orifice;

second means controllable to open the orifice after it has been closed by the first means; and third means for partially cutting off the communication between the tank and the drainage chamber when the gas pressure in the drainage chamber is lower than the gas pressure in the tank.

BRIEF DESCRIPTION OF THE DRAWING

A particular embodiment of the present invention is described hereinbelow by way of example with reference to the accompanying drawing which comprises a single FIGURE representing a vertical cross-section of an embodiment of the drainage device in accordance with the invention.

DESCRIPTION OF THE PREFERRED EMBODIMENT

In the FIGURE, a stand 13 which is cylindrical about a vertical axis 30 includes an inner cavity which is open at the top and forms the lower portion of a drainage chamber 9. A horizontal removal pipe or passage 10 is disposed in the stand 13 under the drainage chamber. One end 11 of said pipe communicates with the atmosphere via a diaphragm 12. The drainage chamber 9 is connected to the removal pipe 10 by a small-diameter outlet orifice 16 disposed along the axis 30. A control unit 18 is fixed on the stand 13 on the opposite side to the end 11 of the pipe 10 and is connected to said pipe 10 by a horizontal by-pass tube or passage 17 having a smaller diameter than that of the pipe 10.

A cylindrical body 14 whose inner cavity is open at the bottom is connected to the stand 13 in a sealed manner by means of a seal 15 so as to form the upper portion of the drainage chamber 9. The body 14 has an upper opening 31 centred on the axis 30. A vertical tubular guide 4 is fixed below the opening 31 and is disposed inside the drainage chamber along the axis 30. Small openings 6 in the top of the guide 4 make the drainage chamber communicate with the top of the opening 31. A moving core 5 whose conical lower portion can stop the upper end 8 of the orifice 16 and whose upper portion is limited by a plane horizontal surface 32 can slide vertically along the axis 30. The core may have a neck in its middle to leave a free space between its outer surface and the inner wall of the guide 4. The core 5 then has internal passages such as 34 and 35 and the guide 4 has openings such as 36 to make the free space communicate with the drainage chamber proper.

A cylindrical casing 1 is fixed on the upper portion of the body 14. The lower portion of said casing contains a stationary central core 7 centred on the axis 30 and limited by an upper plane surface 33 disposed horizontally adjacent to the surface 32 of the core 5. A coil spring 24 whose ends press respectively on the stationary core 7 and on the moving core 5 makes it possible to apply the lower end of the core 5 against the upper portion 8 of the orifice 16 so as to stop said orifice. A toroidal cavity which surrounds the core 7 is formed in the casing 1. Said cavity is open at the top for an excitation coil 19 to be inserted therein before the casing 1 is fixed on the body 14. By means of a seal ring 27, a coaxial tube 26 is disposed at the lower portion of the stationary core 7. The outside surface of the tube 26 is in contact with a seal ring 28 which is inserted in the opening 31 so as to provide sealed closure of the toroidal cavity which contains the winding 19.

The stationary core 7 includes an axial passage 25 one of whose ends communicates with the end surface 33 of said core. The other end of the passage 25 is connected to a horizontal pipe 20 which communicates with air under pressure. The passage 25 is connected to the pipe 20 by a vertical valve 21 fitted with a return spring 22 and a stop 23.

The stand 13, the body 14 and the casing 1 are assembled by a flange 2 fixed by threaded studs 3 on which bolts 29 are screwed.

The drainage device described hereinabove and illustrated in the FIGURE operates as follows.

Before the drainage device is connected to the compressed gas tank which is to be drained, the lower portion of the moving core 5 stops the orifice 16 urged by the spring 24 and the valve 21 is held open by the spring 22.

The pipe 20 is connected by a passage to the outlet of a valve situated at the lower portion of the tank. As soon as the valve opens, compressed air saturated with dampness arrives through the pipe 20 and the pressure of said air immediately closes the valve 21, the spring 22 then being compressed. The valve 21 is set so that in the closed position, its leakage cross-section is very small with respect to the fluid flow cross-section through the open valve. Due to said leakage, the air saturated with dampness slowly enters the passage 25 then through the openings 6, it enters the drainage chamber 9 whose outlet orifice 16 is closed. When the pressure in the drainage chamber reaches that in the tank, the valve 21 whose inlet and outlet are at the same pressure opens, urged by the spring 22.

The winding 19, the casing 1, the body 14 and the moving core 5 which opens or closes the outlet orifice 16 of the drainage cham-er 9 constitute an electrically operated valve. To drain the tank, the winding 19 of the electrically operated valve is connected to a source of electric current. This cause the moving core 5 to rise due to the compression of the spring 24, the surfaces 32 and 33 of the moving core 5 and of the stationary core 7 being in contact. The inside of the drainage chamber 9 is then made to communicate with the atmosphere via the pipe 10. This removes the air charged with dampness that filled the drainage chamber.

The air charged with dampness driven out of the drainage chamber 9 causes a sudden increase in pressure in the removal pipe 10. The by-pass pipe 17 transmits the increase in pressure to the control device 18 which rocks at a predetermined pressure lower than that of the tank and operates an electric contact in series with the circuit of an alarm unit. The alarm unit circuit is supplied with some delay when the electrically operated valve opening control pulse is applied and is therefore cut out. This prevents the alarm unit from operating. In contrast, in the exceptional case where the electrically operated valve opening control pulse is not followed by any effect after a predetermined period of time, the alarm unit is caused to operate. The decrease in gas pressure created in the drainage chamber 9 by removal of the air drained out therefrom causes the valve 21 to close by compressing the spring 22. Therefore, the drainage chamber 9 no longer communicates with the compressed air in the tank. This results in extremely low air consumption at each drainage operation. After the winding 19 is de-energized, the small leakage at the closed valve 21 allows the drainage chamber to be filled again. Therefore, air consumption during drainage is considerably less in the device in accordance with the invention than in known devices.

Said device drains the tank more completely by preventing the compressed air in the tank from passing suddenly through the layer of liquid situated at the bottom of the tank. The above phenomenon is currently observed in drainage devices in accordance with the prior art and reduces drainage efficiency while increasing air consumption.

In the event of faulty sealing between the end of the outlet orifice 16 and the lower point of the moving core 5, the resulting leakage of compressed air is smaller than in devices in accordance with the prior art. Therefore, it is possible to isolate the fault before the store of compressed air is completely exhausted.

The device in accordance with the invention may advantageously be applied to compressed air tanks which supply gas-blast circuit-breakers of high-tension electric units. In the above case, the low air consumption drainage device in accordance with the invention makes it possible to prevent the operation of such circuit-breakers from being automatically stopped, said stoppage being controlled by security devices when pressure is insufficient. Using the component 18 then enables a very certain check on the operation of the drainage device to be made by pneumatic effect.

We claim:

1. A drainage device for removing liquid contained in a compressed gas tank, said device including:
   a drainage chamber, means for communicating said drainage chamber with the lower portion of the tank, said drainage chamber being provided with an outlet orifice which opens to a pressure which is less than the tank pressure;
   first means for closing the outlet orifice;
   second means for opening the orifice after it has been closed by the first means; and
   third means for partially cutting off communication between the tank and the drainage chamber when the gas pressure in the drainage chamber is lower than the gas pressure in the tank.

2. A device according to claim 1, wherein the third means include a valve disposed in a passage which communicates the tank with the drainage chamber, means for causing said valve to be open when the gas pressure in the drainage chamber is equal to that in the tank, means for causing said valve to be closed when the gas pressure in the drainage chamber is lower than the gas pressure in the tank, and said valve having a leakage cross-section when closed which is small with respect to the fluid flow cross-section of the open valve.

3. A device according to claim 1, wherein the first means and the second means include an electrically operated valve.

4. A device according to claim 1, further including a control unit disposed at the outlet of the orifice of the drainage chamber, said control unit including means sensitive to the pressure of the fluid which leaves the drainage chamber via said orifice for starting up an alarm unit when said pressure remains lower than a predetermined threshold after a control pulse from the electrically operated valve.

5. A device according to claim 3, wherein the electrically operated valve includes a casing and an excitation winding which is fixed on the walls of the drainage chamber, a moving core disposed inside the drainage chamber and resilient means for pressing one end of the core against the outlet orifice so as to close off said outlet orifice.

* * * * *